US010532501B2

(12) United States Patent
Okudaira et al.

(10) Patent No.: US 10,532,501 B2
(45) Date of Patent: Jan. 14, 2020

(54) RESIN FILLING DEVICE AND RESIN FILLING METHOD FOR MAGNET EMBEDDED CORE

(71) Applicant: KURODA PRECISION INDUSTRIES LTD., Kanagawa (JP)

(72) Inventors: Hironobu Okudaira, Kanagawa (JP); Tomoaki Murayama, Kanagawa (JP); Osamu Fukuyama, Kanagawa (JP)

(73) Assignee: KURODA PRECISION INDUSTRIES LTD., Kanagawa (JP)

( * ) Notice: Subject to any disclaimer, the term of this patent is extended or adjusted under 35 U.S.C. 154(b) by 293 days.

(21) Appl. No.: 15/555,337

(22) PCT Filed: May 8, 2015

(86) PCT No.: PCT/JP2015/002356
§ 371 (c)(1),
(2) Date: Sep. 1, 2017

(87) PCT Pub. No.: WO2016/181421
PCT Pub. Date: Nov. 17, 2016

(65) Prior Publication Data
US 2018/0065285 A1 Mar. 8, 2018

(51) Int. Cl.
*B29C 45/14* (2006.01)
*B29C 45/34* (2006.01)
(Continued)

(52) U.S. Cl.
CPC ........ *B29C 45/14344* (2013.01); *B29C 45/27* (2013.01); *B29C 45/34* (2013.01);
(Continued)

(58) Field of Classification Search
CPC ... B29C 45/14344; B29C 45/27; B29C 45/34; H02K 15/03; H02K 1/276; B29L 2031/749; B29K 2995/0008
See application file for complete search history.

(56) References Cited

U.S. PATENT DOCUMENTS 7,897,089 B2 * 3/2011 Matsubayashi ........ H02K 15/03
264/279
2011/0202940 A1 * 8/2011 Ito ..................... B29C 45/14598
720/695
(Continued)

FOREIGN PATENT DOCUMENTS

JP   2006197693   7/2006
JP   2007110880   4/2007
(Continued)

OTHER PUBLICATIONS

International Search Report for PCT/JP2015/002356 dated Aug. 11, 2015, 4 pages.

*Primary Examiner* — Jeffrey M Wollschlager
(74) *Attorney, Agent, or Firm* — Dority & Manning, P.A.

(57) ABSTRACT

A resin filling device includes: a first mold and a second mold provided so as to face each other to sandwich therebetween a laminated iron core and thereby to fix the laminated iron core; a flow path forming member provided to the first mold so as to be engageable with one of the axial ends of the laminated iron core and forming a resin flow path through which a resin flows; and a fitting member provided to the second mold to be fitted into an opening portion of the flow path forming member that is in communication with the resin flow path, wherein the fitting member is provided with a vent portion for discharging air in the resin flow path to outside.

8 Claims, 8 Drawing Sheets

(51) Int. Cl.
*H02K 15/03* (2006.01)
*B29C 45/27* (2006.01)
*B29L 31/00* (2006.01)
*H02K 1/27* (2006.01)

(52) U.S. Cl.
CPC ...... *H02K 15/03* (2013.01); *B29K 2995/0008* (2013.01); *B29L 2031/749* (2013.01); *H02K 1/276* (2013.01)

(56) References Cited

U.S. PATENT DOCUMENTS

2013/0234363 A1* 9/2013 Nagai .................... H01F 41/02
264/261
2015/0054196 A1* 2/2015 Ishimatsu ......... B29C 45/14467
264/263

FOREIGN PATENT DOCUMENTS

| JP | 2014046553 | * | 3/2014 |
| JP | 2014083811 | * | 5/2014 |
| JP | 2015053757 |   | 3/2015 |

* cited by examiner

RESIN FILLING DEVICE AND RESIN FILLING METHOD FOR MAGNET EMBEDDED CORE

TECHNICAL FIELD

The present invention relates to a resin filling device and a resin filling method for a magnet embedded core in which magnets inserted in magnet insertion holes of a motor core are embedded with a resin.

BACKGROUND ART

Conventionally, as a core for motors used in automobiles, electric appliances or the like, a magnet embedded core, in which magnets accommodated in magnet insertion holes formed in a laminated iron core are embedded with a resin, is widely used.

With regard to the magnet embedded core of this kind, it is desired that leakage of the resin during filling of the resin by a resin filling device can be prevented and the magnets can be fixed at predetermined positions. To meet such demands, for example, a configuration is known in which a resin filling device for resin-molding a magnet embedded motor core includes one mold provided with a transfer mechanism and another mold facing the one mold and provided with a movable block, where the movable block is supported by an urging means so as to be inserted into a central through-hole of the motor core through an opening on a side of the other mold and fitted into a hole of an intermediate mold disposed on a side of the one mold (for example, see Patent Document 1).

PRIOR ART DOCUMENT(S)

Patent Document(s)

Patent Document 1: JP2014-83811A

SUMMARY OF THE INVENTION

Task to be Accomplished by the Invention

Incidentally, in the conventional resin filling device as described in the aforementioned Patent Document 1, if air is mixed into the resin injected from the mold, air accumulation may occur in a resin flow path in the mold and the flow of the resin may become uneven, or the mixture of air in the resin may produce voids, which may inhibit stable filling of the resin into the magnet insertion holes. Therefore, it is desirable that the resin filling device as described above have a structure for readily discharging air mixed into the resin in the mold from the resin flow path.

The present invention is made in view of such problems in the prior art, and a primary object thereof is to provide a resin filling device and a resin filling method for a magnet embedded core, that facilitate discharging of air mixed into the resin to be filled in the magnet insertion holes to the outside of the resin flow path.

Means to Accomplish the Task

According to a first aspect of the present invention, there is provided a resin filling device (20) for embedding a magnet (4) inserted in a magnet insertion hole (3) provided in a laminated iron core (2) for a magnet embedded core (1) with a resin (6), the device comprising: a first mold (22) and a second mold (21) provided so as to face each other to sandwich therebetween the laminated iron core at axial ends thereof and thereby to fix the laminated iron core; a flow path forming member (44) provided to the first mold so as to be engageable with one of the axial ends of the laminated iron core and forming a resin flow path (43) through which the resin flows; and a fitting member (32) provided to the second mold to be fitted into an opening portion of the flow path forming member that is in communication with the resin flow path, wherein the fitting member is provided with a vent portion (38, 62) for discharging air in the resin flow path to outside.

In the resin filling device for a magnet embedded core according to the first aspect, because a vent portion for discharging air in the resin flow path to outside is provided to the fitting member, it is possible to facilitate discharging of air mixed into the resin to be filled in the magnet insertion holes to the outside of the resin flow path.

According to a second aspect of the present invention, with regard to the aforementioned first aspect, the fitting member includes: a distal end portion (35) to be inserted into the opening portion; and a closure portion (36) forming an enlarged part connected to a rear side of the distal end portion, the closure portion being formed with an abutting surface (37) to abut against a region of an outer surface of the flow path forming member surrounding an opening end of the opening portion, and the vent portion is constituted of at least one groove (38) formed to cut out a part of the abutting surface of the closure portion.

In the resin filling device for a magnet embedded core according to the second aspect, because the vent portion is constituted of a groove formed to cut out a part of the abutting surface of the closure portion, it is possible to facilitate discharging of air mixed into the resin to the outside of the resin flow path with a simple structure.

According to a third aspect of the present invention, with regard to the aforementioned second aspect, the resin flow path (43) includes an annular portion (55) defined by the opening portion of the flow path forming member and the distal end portion of the fitting member, and the groove discharges air staying in the annular portion to outside.

In the resin filling device for a magnet embedded core according to the third aspect, because the groove is formed at a part where the air mixed into the resin tends to stay (annular portion), it is possible to readily discharge the air mixed into the resin to the outside of the resin flow path.

According to a fourth aspect of the present invention, with regard to the aforementioned second or third aspect, the groove is formed to extend radially from a center side to an outer side of the closure portion.

In the resin filling device for a magnet embedded core according to the fourth aspect, it is possible to effectively discharge air from the part where the air mixed into the resin tends to stay to the outside of the resin flow path.

According to a fifth aspect of the present invention, with regard to the aforementioned fourth aspect, the resin flow path includes a plurality of runner portions extending radially from a central portion of the flow path forming member in an outward direction, and the groove and the runner portions are arranged to extend in different directions as seen in plan view.

In the resin filling device for a magnet embedded core according to the fifth aspect, by evenly discharging air from the part where the air mixed into the resin tends to stay to the outside of the resin flow path, it is possible to equalize the flow of the resin in the runner portions.

According to a sixth aspect of the present invention, there is provided a resin filling method for embedding a magnet inserted in a magnet insertion hole provided in a laminated iron core for a magnet embedded core with a resin, the method comprising: a fixing step of sandwiching the laminated iron core at axial ends thereof between a first mold and a second mold disposed to face each other; a fitting step of fitting a fitting member provided to the second mold into an opening portion provided to the first mold so as to be in communication with a resin flow path through which the resin flows; and a resin injecting step of injecting the resin into the magnet insertion hole via the resin flow path, wherein the resin injecting step includes a venting step of discharging air in the resin flow path to outside via a vent portion provided to the fitting member.

Effect of the Invention

As described above, according to the present invention, it is possible to facilitate discharging of air mixed into the resin to be filled in the magnet insertion holes to the outside of the resin flow path.

DESCRIPTION OF THE PREFERRED EMBODIMENT(S)

Embodiments of the present invention are described in the following with reference to the appended drawings.

Figure 1:
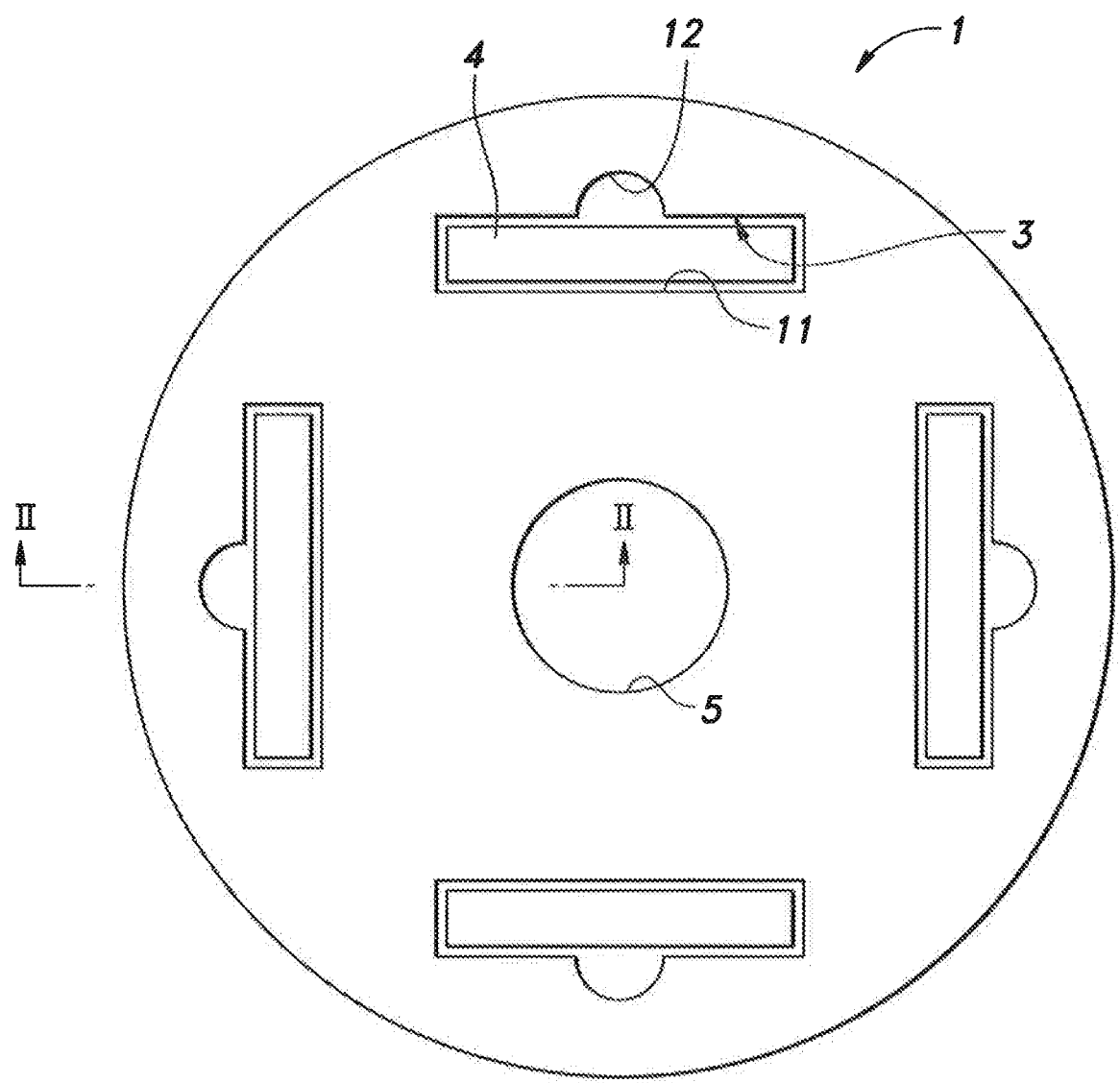
FIG. 1 is a plan view of a magnet embedded rotor filled with a resin by a resin filling device according to an embodiment.
Figure 2:
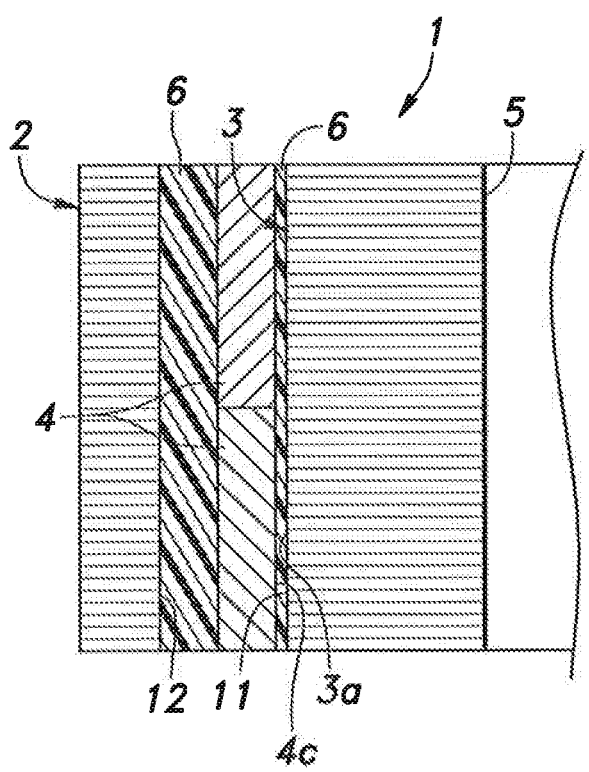
FIG. 2 is a sectional view taken along line II-II in FIG. 1.

FIG. 1 is a plan view of a magnet embedded rotor filled with a resin by a resin filling device according to an embodiment of the present invention, and FIG. 2 is a sectional view taken along line II-II in FIG. 1.

As shown in FIG. 1, a magnet embedded rotor (magnet embedded core) 1 is a constituent part of a motor or the like, and includes a rotor core (motor core) 2 consisting of a laminated iron core, and magnets 4 accommodated respectively in a plurality of magnet insertion holes 3 formed in the rotor core 2. The laminated iron core constituting the rotor core 2 is formed by stacking a plurality of electromagnetic steel plates connected together by a known connecting method (crimping, gluing, laser-welding, etc.). The rotor core 2 is substantially in a shape of an annular ring as seen in plan view, and is provided with an axial hole 5 opened at the center thereof, into which a shaft not shown in the drawing is securely fitted.

The magnet insertion holes 3 have an identical shape to one another and are provided to extend through the rotor core 2 in the axial direction. Each magnet insertion hole 3 includes a magnet accommodating portion 11 having a substantially rectangular shape as seen in plan view and a substantially semicircular gate inserting portion 12 connected to a central portion of one side of the magnet accommodating portion 11 adjacent to the outer circumference. In this embodiment, an example is shown in which the magnet insertion holes 3 are arranged at four positions at equal intervals in the circumferential direction of the rotor core 2, but the shape, number, and arrangement of the magnet insertion holes 3 may be altered in various ways without being limited to this embodiment.

Each magnet 4 has a substantially rectangular parallelepiped shape, and as shown in FIG. 2, is inserted into the magnet accommodating portion 11 of one of the magnet insertion holes 3 with a prescribed gap and fixed by a resin 6 (here, thermoplastic resin) filled in the magnet insertion hole 3. Each magnet 4 is constituted of a plurality of permanent magnets (e.g., ferrite-based sintered magnets, neodymium magnets, etc.) inserted in a single magnet insertion hole 3 in series in the axial direction, but the present invention is not limited to this and a single permanent magnet may be used. Further, in FIG. 2, the axial length of the magnet 4 (two permanent magnets) is shown to be the same as the axial length of the magnet insertion hole 3, but in practice, the axial length of the magnet 4 is set to be slightly shorter than that of the magnet insertion hole 3. It is to be noted that in FIG. 2, the gap between the inner surface of the magnet accommodating portion 11 and the side surface of the magnet 4 is shown larger than it actually is.

Figure 3:
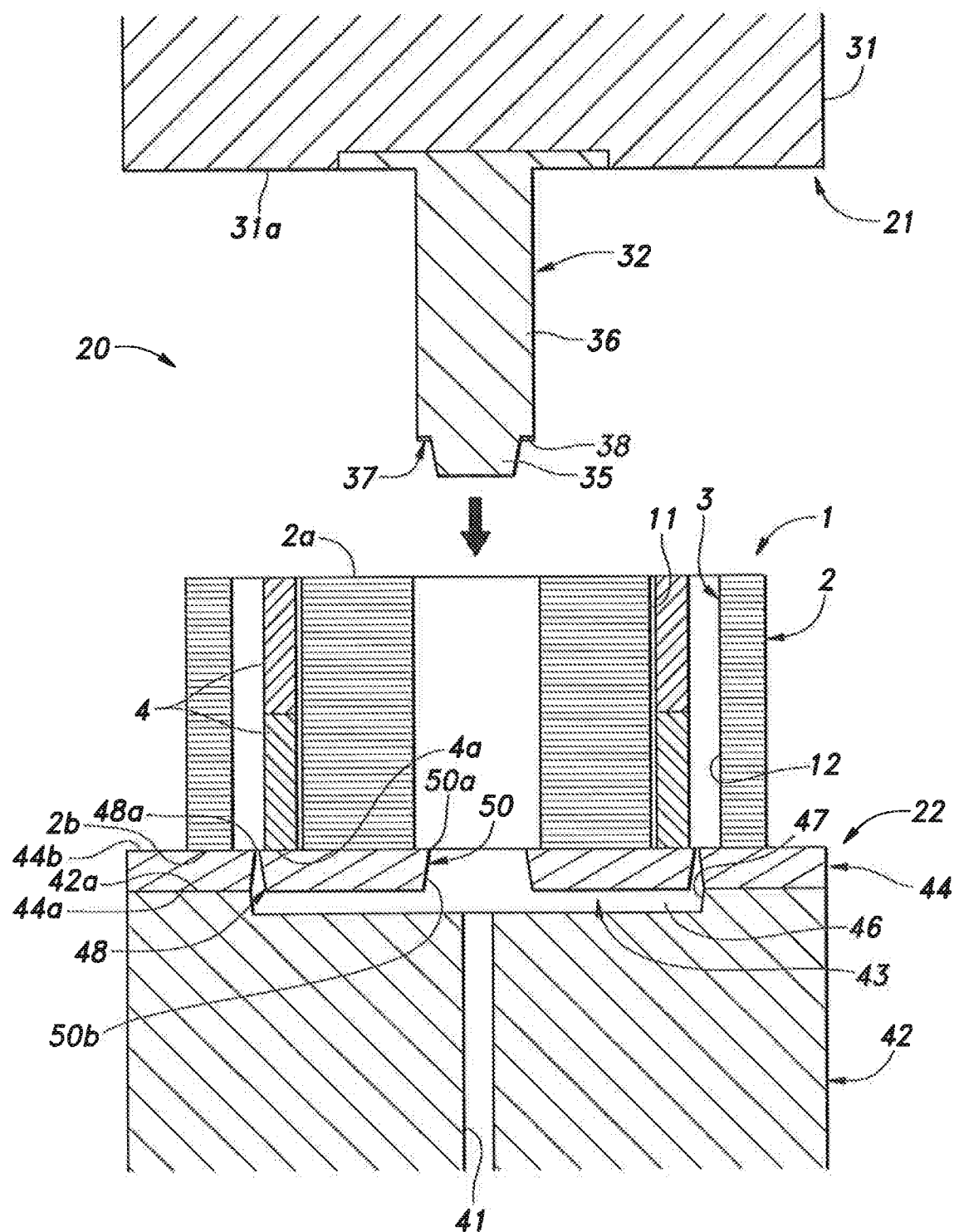
FIG. 3 is a sectional view showing a first state of the resin filling device according to the embodiment.
Figure 4:
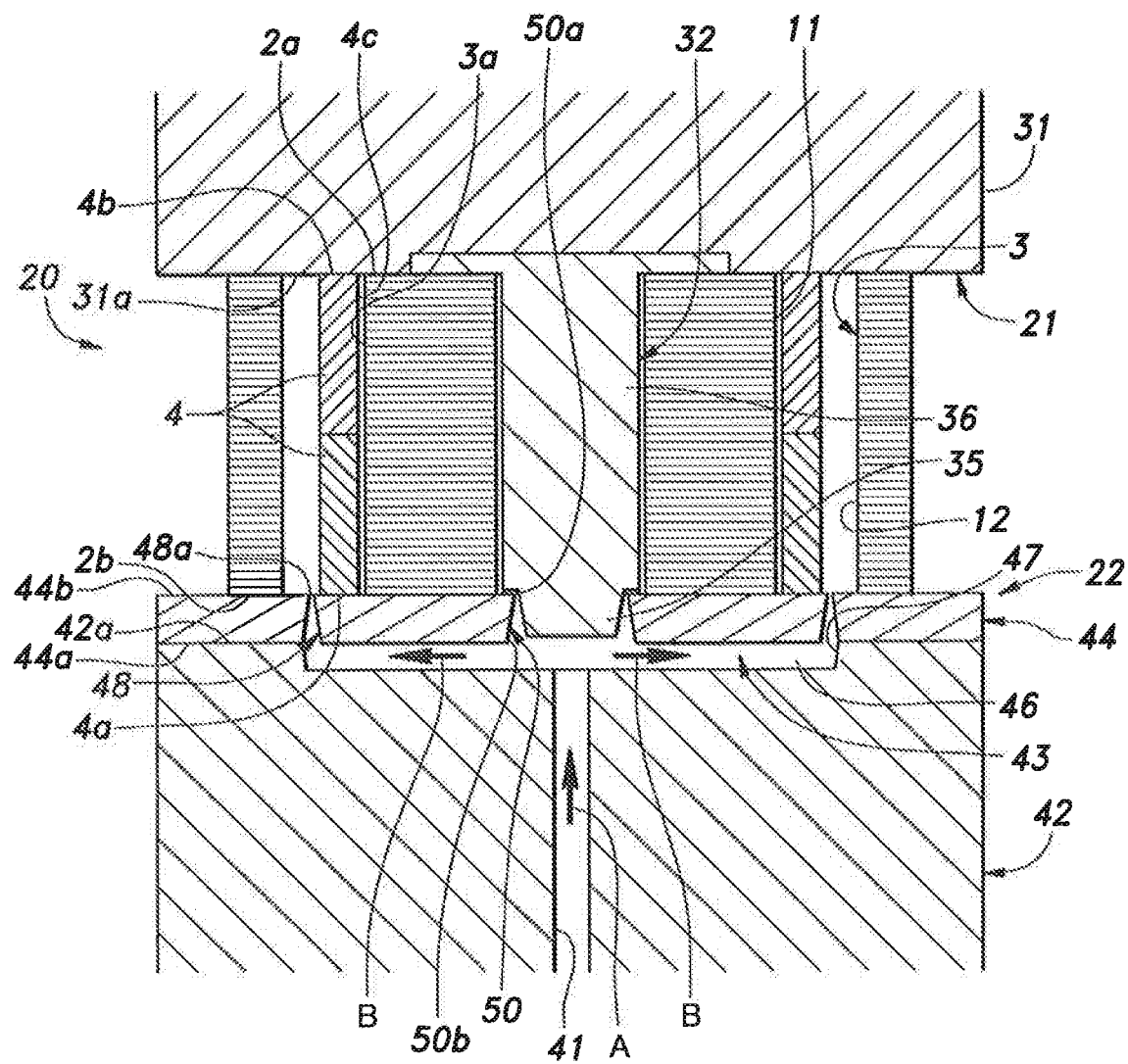
FIG. 4 is a sectional view showing a second state of the resin filling device according to the embodiment.
Figure 5:
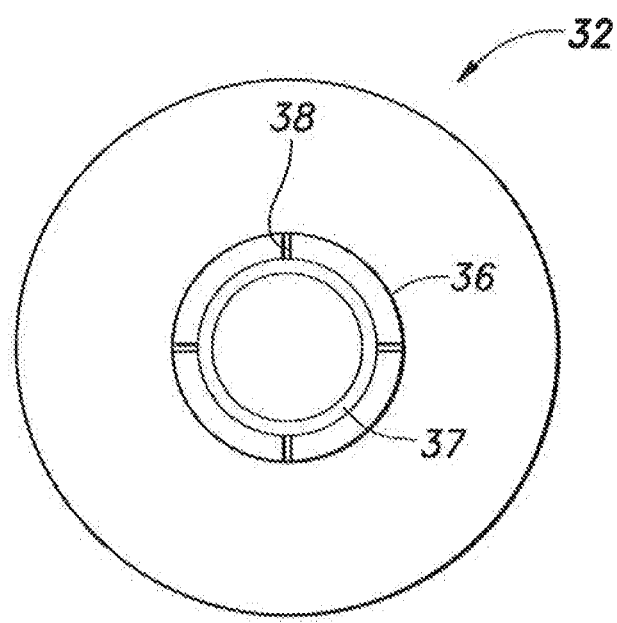
FIG. 5 is a bottom view of a fitting block of the resin filling device according to the embodiment.
Figure 6:
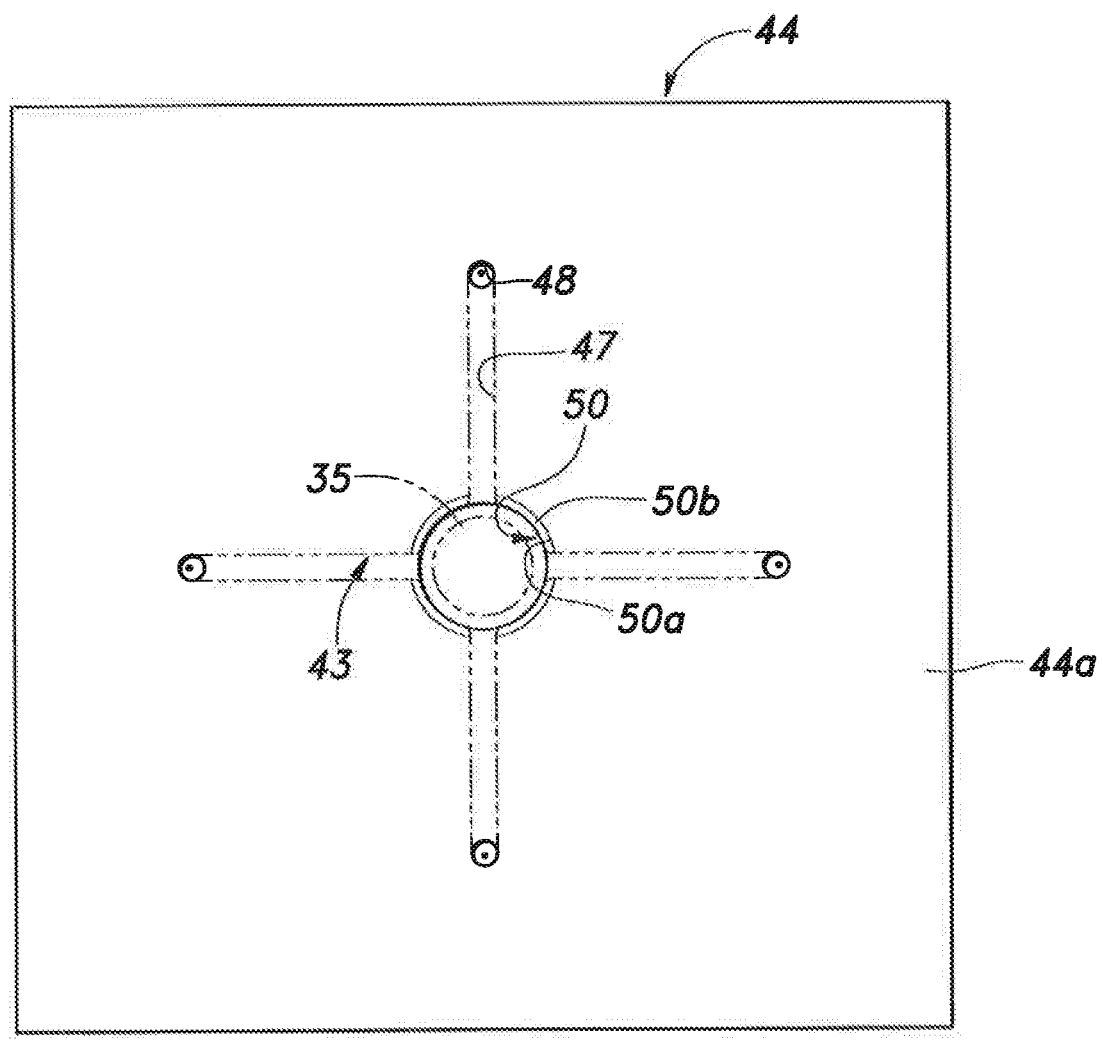
FIG. 6 is a bottom view of a runner plate of the resin filling device according to the embodiment.
Figure 7:
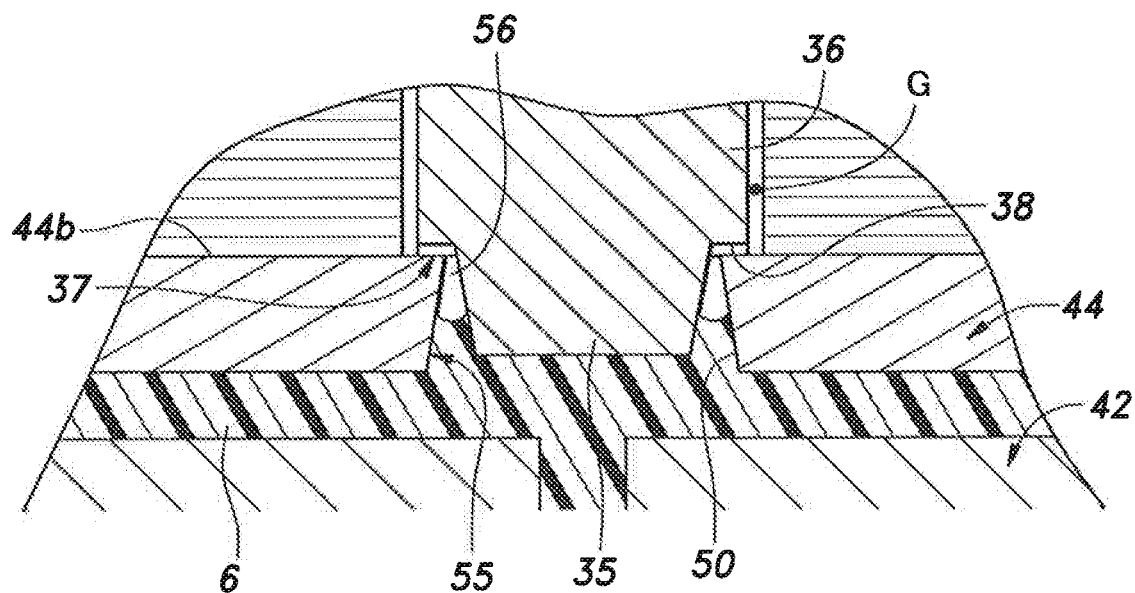
FIG. 7 is an enlarged view of a main part of the resin filling device shown in FIG. 4.

FIG. 3 and FIG. 4 are sectional views respectively showing a first state and a second state of the resin filling device 20 for the magnet embedded rotor 1 according to the embodiment, FIG. 5 is a bottom view of a fitting block of the resin filling device 20, FIG. 6 is a bottom view of a runner plate of the resin filling device 20, and FIG. 7 is an enlarged view of a main part of the resin filling device 20 shown in FIG. 4. It is to be noted that in FIG. 4, the resin in the magnet insertion holes 3 and in the resin flow path is omitted.

As shown in FIG. 3 and FIG. 4, the resin filling device 20 is an injection molding device for embedding the magnets 4 accommodated in the magnet insertion holes 3 provided in the rotor core 2 with a resin, and includes an upper mold (second mold) 21 and a lower mold (first mold) 22 disposed to face each other vertically. Here, the upper mold 21 located at an upper position is configured to be a movable mold, while the lower mold 22 located at a lower position is configured to be a stationary mold, but the present invention is not limited to this, and the arrangement (direction) of the upper mold 21 and the lower mold 22 may be varied and either one of the two molds may be stationary or movable.

The upper mold 21 includes an upper mold main body 31 formed with a lower surface 31a to abut against an upper surface 2a of the rotor core 2, and a fitting block (fitting member) 32 protruding downward from the lower surface 31a of the upper mold main body 31. The fitting block 32 has a distal end portion 35 forming a lower end portion thereof and tapered downward (in a shape of an inverted truncated cone) and a block main body (closure portion) 36 located above the distal end portion 35 and having substantially cylindrical shape.

The outer circumference of the block main body 36 should be provided so as to be fitted into the axial hole 5 of the rotor core 2 with a high precision. Thereby, the position of the rotor core 2 (magnet insertion holes 3) when resin is filled can be determined accurately. Further, a lower portion of the block main body 36 constitutes an enlarged part (a part with a larger diameter) connected to an upper end of the distal end portion 35, and this forms a substantially annular, downward-facing shoulder surface (abutting surface) 37. As also shown in FIG. 5, the lower portion of the block main body 36 is provided with grooves 38 arranged at four positions at equal intervals in the circumferential direction so as to cut out parts of (or divide) the shoulder surface 37. Each groove 38 extends radially from a center side (inner side) to a radially outer side of the block main body 36 and, as described in detail later, constitutes a vent portion for discharging air mixed into the resin.

It is to be noted that the shape, size, and arrangement of the grooves 38 are not limited to those illustrated here and various alterations and modifications may be made thereto. Further, the distal end portion 35 does not necessarily have to be tapered, and may be in a substantially cylindrical shape so long as it has a smaller diameter (or width) than the block main body and can form the shoulder surface 37.

The lower mold 22 includes a lower mold main body 42 formed with a sprue 41 that is a passage for guiding resin from a nozzle of an injection molding machine not shown in the drawings, and a runner plate (flow path forming member) 44 consisting of a substantially planar plate, the runner plate 44 being attached to an upper surface 42a of the lower mold main body 42 so as to be engageable with a lower end portion (lower surface) of the rotor core 2 and forming, in cooperation with the lower mold main body 42, runner portions 43 connected to a downstream end of the sprue 41. The sprue 41 extends through the lower mold main body 42 vertically, and guides the resin from the bottom to the top of the lower mold 22.

The runner portions 43 include a plurality of branch passages 46 that are connected to the downstream end (here, upper end) of the sprue 41 and extend horizontally and radially from a center side of the rotor core 2 toward the respective magnet insertion holes 3. Here, four branch passages 46 are arranged in a substantially cross shape, and these branch passages 46 are defined by grooves 47 provided in the upper surface 42a of the lower mold main body 42 and a lower surface 44a of the runner plate 44 covering the grooves 47 (see FIG. 6). A downstream end (here, outer end) of each branch passage 46 is provided with a gate portion (resin injecting portion) 48.

It is to be noted that in this embodiment, as shown in FIG. 5 and FIG. 6, the grooves 38 of the block main body 36 and the grooves 47 of the lower mold main body 42 that form the runner portions 43 in cooperation with the runner plate 44 (see the imaginary lines in FIG. 6) are arranged to extend in the same directions (overlap each other) as seen in plan view, but the grooves 38 of the block main body 36 and the grooves 47 of the runner plate 44 may be arranged to extend in different directions (for example, arrangement may be made such that the grooves 38 of the block main body 36 shown in FIG. 5 are rotated 45 degrees). This makes it possible to evenly discharge air from an annular portion 55 to the outside of the resin flow path and equalize the flow of the resin in the runner portions 43.

Further, in this embodiment, the grooves 47 for defining the runner portions 43 are provided in the upper surface 42a of the lower mold main body 42, but a configuration may also be made such that similar grooves are provided in the lower surface 44a of the runner plate 44. In this case, the branch passages 46 are defined by the grooves provided in the lower surface 44a of the runner plate 44 and the upper surface 42a of the lower mold main body 42 covering these grooves 47.

The gate portion 48 is formed to make a passage tapered upward from the downstream end of each branch passages 46, and a distal end portion 48a of the gate portion 48, which serves as a downstream end, opens out in an upper surface 44b of the runner plate 44 at a position opposing one of the magnet insertion holes 3.

Thus, in the lower mold 22, the sprue 41, the runner portions 43, and the gate portions 48 constitute a resin flow path for guiding resin from the injection molding machine to the magnet insertion holes 3.

In addition, at a central portion of the runner plate 44 is provided a circular opening portion 50 that extends in the axial direction (here, vertical direction) of the rotor core. The opening portion 50 is formed as a tapered hole that has a gradually increasing diameter from an upper opening end 50a to a lower opening end 50b thereof. As shown in FIG. 7, the substantially annular shoulder surface 37 of the lower portion of the block main body 36 can close the resin flow path (runner portions 43) by abutting against (or closely contacting) a region (part of the upper surface 44b of the runner plate 44) surrounding the opening end 50a of the opening portion 50. It is to be noted that though the opening portion 50 is formed as a tapered hole here, the tapering of the opening portion 50 is not indispensable, and the opening portion 50 may be formed as a hole having a constant diameter in the direction of extension.

Subsequently, by moving down the upper mold 21 from the state shown in FIG. 3, the rotor core 2 is fixed by being sandwiched vertically between the upper mold 21 and the lower mold 22, as shown in FIG. 4 (fixing step). At the same time, in the upper mold 21, the fitting block 32 is fitted into the axial hole 5 of the rotor core 2, and the distal end portion 35 thereof is inserted into the opening portion 50 of the runner plate 44 (fitting step). In addition, the lower surface 31a of the upper mold main body 31 abuts against the upper surface 2a of the rotor core 2. Thereby, the rotor core 2 is vertically clamped between the lower surface 31a of the upper mold main body 31 and the upper surface 44b of the runner plate 44.

Thereafter, when the injection molding machine not shown in the drawings is operated to cause the resin molten by heat to flow into the sprue 41 with a prescribed pressure, the resin that has flowed into the sprue 41 as shown by arrow A in FIG. 4 flows through the runner portions 43 (branch passages 46) as shown by arrows B in FIG. 4, and is injected into the magnet insertion holes 3 via the gate portions 48 (resin injecting step). At this time, as shown in FIG. 7, an annular portion 55 is formed in the resin flow path (runner portions 43) by being defined by the opening portion 50 of the runner plate 44 and the distal end portion 35 of the fitting block 32, and an air staying portion 56 for the air mixed into the resin 6 is formed in an upper part of the annular portion 55. Here, the annular portion 55 is in communication with an inner end (center-side end) of each branch passage 46 and is positioned above each branch passage 46. Further, the annular portion 55 is tapered upward (toward the upper mold 21) as seen in a vertical sectional view shown in FIG. 7.

With such a configuration, the air staying in the air staying portion 56 is discharged via each groove 38 to a gap G between the outer circumferential surface of the block main body 36 and the inner circumferential surface of the axial hole 5. This gap G is in communication with the outside of the resin filling device 20. It is to be noted that each groove 38 is preferably configured in such a shape and size that it allows air to be discharged therethrough but prevents resin from passing therethrough.

Once the magnet insertion holes 3 are filled with the resin, the resin 6 in the magnet insertion holes 3 is cooled and cured. Thereafter, the upper mold 21 is lifted to the position shown in FIG. 3, and the rotor core 2 (magnet embedded rotor 1) filled with the resin is taken out of the resin filling device 20. In this embodiment, the runner plate 44 is fixed to the lower mold main body 42, and the rotor core 2 filled with the resin alone is taken out of the resin filling device 20. However, the present invention is not limited to this, and the runner plate 44 may be detachably provided to the lower mold main body 42, such that the rotor core 2 filled with the resin may be taken out of the resin filling device 20 together with the runner plate 44.

As described above, in the resin filling device 20, because the grooves 38 (vent portion) for discharging the air in the resin flow path are provided in the fitting block 32, the air mixed into the resin 6 to be filled in the magnet insertion holes 3 can be readily discharged to the outside of the resin flow path.

It is to be noted that in this embodiment, the entire areas of end surfaces 4a, 4b (lower surface, upper surface) of each magnet 4 after the filling of the resin are exposed from upper and lower openings of the magnet insertion hole 3, but a configuration in which the entire area or a partial area of at least one of the end surfaces 4a, 4b of the magnet 4 is covered with the resin 6 (namely, a configuration in which the axial length of the magnet 4 is smaller than the axial length of the magnet insertion hole 3) is also possible.

Figure 8:
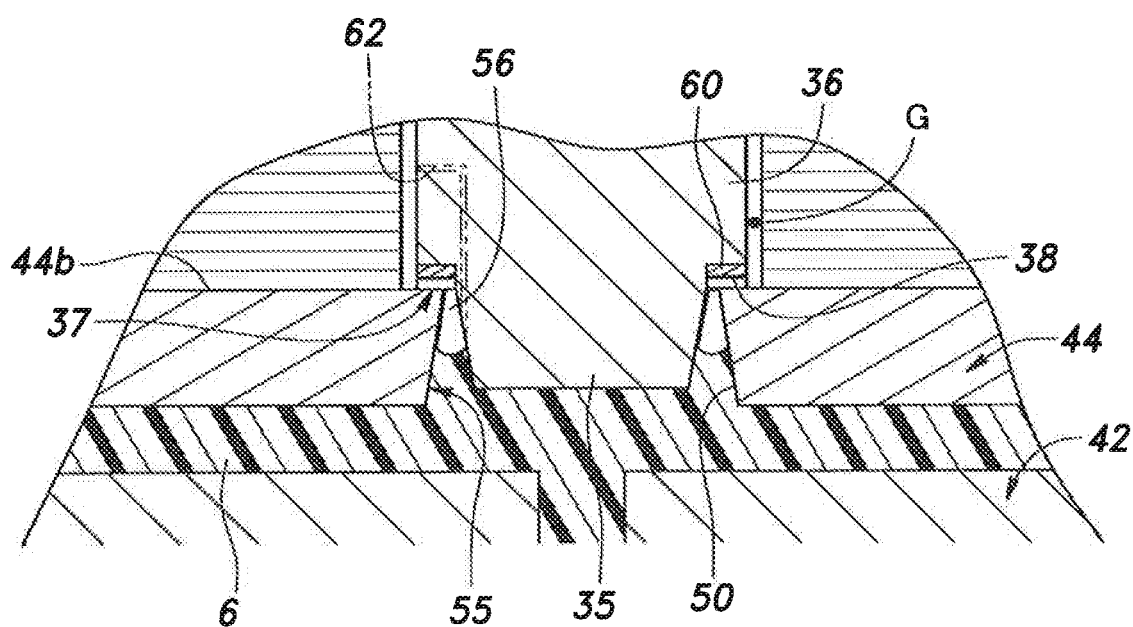
FIG. 8 is a diagram showing a modification of the fitting block of the resin filling device according to the embodiment.

FIG. 8 is a diagram showing a modification of the fitting block 32 of the resin filling device 20. In the foregoing example, the lower portion of the block main body 36 was provided with the grooves 38 to constitute the vent portion for discharging air mixed into the resin, but the present invention is not limited to this, and various alterations and modifications may be made of the vent portion.

For example, as shown in FIG. 8, configuration may be made such that a substantially disk-shaped ring member 60 is attached to the lower portion of the block main body 36, and the ring member 60 is provided with the grooves 38 similar to those described above. In this case, the ring member 60 is provided as a separate member from the block main body 36, and therefore, there is an advantage that the size and shape of the grooves 38 can be adjusted easily.

In some cases, instead of the above-described grooves 38 or in addition to the grooves 38, an air discharge passage 62 communicating the resin flow path (here, the annular portion 55) with the outside (here, the gap G) may be provided in the fitting block 32, as shown by two-dot chain lines in FIG. 8. In this case, the route and opening position of the air discharge passage 62 in the resin flow path and the gap G may be varied in various ways so long as the air in the resin flow path can be discharged to the gap G. Further, the air discharge passage 62 is preferably provided in such a shape and size that it prevents resin to pass therethrough.

The present invention has been described in the foregoing based on the specific embodiments thereof, but these embodiments are for illustrative purposes only, and the present invention is not limited to these embodiments. For example, in the above embodiment, description was made of an example using injection molding, but another molding technique (for example, transfer molding, etc.) may be used in the present invention without being limited to the embodiment. Further, the filling of the resin into the magnet insertion holes of the rotor core is not limited to the structure in which the resin is injected from the lower mold, and may be realized by a structure in which the resin is injected from the upper mold. In this case, the runner plate is provided to the upper mold and the fitting block is provided to the lower mold. Also, the gate portion does not have to be located at a radially outer side of the magnet, and may be located at a radially inner side or, in some cases, on one side in the circumferential direction or at a corner portion of the rectangular magnet insertion hole. The resin for fixing the magnets is not limited to thermoplastic resin, and other known resins such as a thermosetting resin, a two-part curable resin (e.g., two-part epoxy resin), a moisture-curable resin, a liquid crystal polymer, etc. may be used. Further, the present invention is not limited to a rotor core, and may be applied to a stator core. Not all of the structural elements of the resin filling device and the resin filling method for a magnet embedded core shown in the above embodiments regarding the present invention are necessarily indispensable, and they may be selectively used as appropriate at least without departing from the scope of the present invention.

Glossary 1 magnet embedded rotor (magnet embedded core)
2 rotor core (laminated iron core)
3 magnet insertion holes
4 magnet (permanent magnet)
5 axial hole
6 resin
11 magnet accommodating portion
12 gate inserting portion
20 resin filling device
21 upper mold (second mold)
22 lower mold (first mold)
31 upper mold main body
32 fitting block (fitting member)
35 distal end portion
36 block main body (closure portion)
37 shoulder surface (abutting surface)
38 groove (vent portion)
41 sprue
42 lower mold main body
43 runner portion (resin flow path)
44 runner plate (flow path forming member)
46 branch passage
47 groove
48 gate portion
50 opening portion
55 annular portion
56 air staying portion
60 ring member
62 air discharge passage (vent portion)

The invention claimed is:

1. A resin filling device for embedding a magnet inserted in a magnet insertion hole provided in a laminated iron core for a magnet embedded core with a resin, the laminated iron core having an axial hole extending therethrough at a center thereof, the device comprising:
   a first mold and a second mold provided so as to face each other to sandwich therebetween the laminated iron core at axial ends thereof and thereby to fix the laminated iron core;
   a flow path forming member provided to the first mold so as to be engageable with one of the axial ends of the laminated iron core and forming a resin flow path through which the resin flows to the magnet insertion hole of the laminated iron core sandwiched between the first mold and the second mold, the flow path forming member having an opening portion that is in communication with the resin flow path at a position corresponding to the axial hole; and a fitting member provided to the second mold to be fitted into the axial hole and the opening portion such that a gap is formed between an outer surface of the fitting member and an inner surface of the axial hole, wherein the fitting member is provided with a vent portion such that the gap is in communication with the resin flow path via the vent portion for discharging air in the resin flow path to outside via the vent portion and the gap.

2. The resin filling device for a magnet embedded core according to claim 1, wherein the fitting member includes a distal end portion to be inserted into the opening portion; and a closure portion forming an enlarged part connected to a rear side of the distal end portion, the closure portion being formed with an abutting surface to abut against a region of an outer surface of the flow path forming member surrounding an opening end of the opening portion, and the vent portion is constituted of at least one groove formed to cut out a part of the abutting surface of the closure portion.

3. The resin filling device for a magnet embedded core according to claim 2, wherein the resin flow path includes an annular portion defined by the opening portion of the flow path forming member and the distal end portion of the fitting member, and the groove discharges air staying in the annular portion to outside.

4. The resin filling device for a magnet embedded core according to claim 2, wherein the groove is formed to extend radially from a center side to an outer side of the closure portion.

5. The resin filling device for a magnet embedded core according to claim 4, wherein the resin flow path includes a plurality of runner portions extending radially from a central portion of the flow path forming member in an outward direction, and the groove and the runner portions are arranged to extend in different directions as seen in plan view.

6. The resin filling device for a magnet embedded core according to claim 3, wherein the groove is formed to extend radially from a center side to an outer side of the closure portion.

7. The resin filling device for a magnet embedded core according to claim 6, wherein the resin flow path includes a plurality of runner portions extending radially from a central portion of the flow path forming member in an outward direction, and the groove and the runner portions are arranged to extend in different directions as seen in plan view.

8. A resin filling method for embedding a magnet inserted in a magnet insertion hole provided in a laminated iron core for a magnet embedded core with a resin, the laminated iron core having an axial hole opened at the center thereof, the method comprising:

a fixing step of sandwiching the laminated iron core at axial ends thereof between a first mold and a second mold disposed to face each other, a flow path forming member being provided to the first mold so as to be engageable with one of the axial ends of the laminated iron core and forming a resin flow path through which the resin flows to the magnet insertion hole of the laminated iron core sandwiched between the first mold and the second mold, the flow path forming member having an opening portion that is in communication with the resin flow path at a position corresponding to the axial hole;

a fitting step of fitting a fitting member provided to the second mold into the axial hole of the laminated iron core and the opening portion such that a gap is formed between an outer surface of the fitting member and an inner surface of the axial hole, the fitting member having a vent portion such that the gap is in communication with the resin flow path via the vent portion; and a resin injecting step of injecting the resin into the magnet insertion hole via the resin flow path, wherein the resin injecting step includes a venting step of discharging air in the resin flow path to outside via the vent portion and the gap.

* * * * *